(12) United States Patent
Sinha

(10) Patent No.: US 7,000,237 B1
(45) Date of Patent: Feb. 14, 2006

(54) METHOD FOR COMMUNICATING OCCURRENCE OF EVENTS IN A STORAGE MEDIUM

(75) Inventor: Alok Sinha, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/468,614

(22) Filed: Dec. 21, 1999

(51) Int. Cl.
*G06F 3/00* (2006.01)
*G06F 9/44* (2006.01)
*G06F 9/46* (2006.01)
*G06F 13/00* (2006.01)

(52) U.S. Cl. ................................................. 719/318
(58) Field of Classification Search ................ 709/318; 714/26, 114; 719/310, 313–318, 320
See application file for complete search history.

(56) References Cited

U.S. PATENT DOCUMENTS

| | | | | |
|---|---|---|---|---|
| 5,305,326 A | * | 4/1994 | Solomon et al. | 371/11.1 |
| 5,805,886 A | * | 9/1998 | Skarbo et al. | 709/318 |
| 5,828,882 A | * | 10/1998 | Hinckley | 709/318 |
| 5,884,098 A | * | 3/1999 | Mason, Jr. | 710/52 |
| 6,026,500 A | * | 2/2000 | Topff et al. | 714/26 |
| 6,076,142 A | * | 6/2000 | Corrington et al. | 710/306 |
| 6,182,182 B1 | * | 1/2001 | Bradley et al. | 710/310 |
| 2002/0133669 A1 | * | 9/2002 | Devireddy et al. | 711/114 |

OTHER PUBLICATIONS

Intelligent I/O ($I_2O$) Architecture Specification, Version 2.0, Mar. 1999.
Intelligent I/O ($I_2O$) Architecture Specification, Version 1.5, Mar. 1997.
PLX Technology, The World Leader in PCI Silicon and Software Technology, Processor Independent $I_2O$ Solutions Using Shell and Private Platform, Mark Easley, www.plxtech.com, 23 pages.
Unisys Computer Systems, UNISYS Intelligent LAN and Storage Controllers, Mainframe-class I/O for PC Servers, Chris Harrer, Manager, Enterprise Networking, Unisys Proprietary, May 1999, 31 pages.
$I_2O$ The $I_2O$ Host Environment, Jon Rosdahl, Novell, Inc., 24 pages.
$I_2O$, $I_2O$ Tutorial, $I_2O$ Architecture Specification, rev. 1.5, PC Developer Conference Session #241T, Presented by the $I_2O$ SIG, 17 pages.
$I_2O$®, Core Specification, The $I_2O$ driver model version 1.5, 88 pages.

* cited by examiner

*Primary Examiner*—Meng-Al T. An
*Assistant Examiner*—Diem Cao
(74) *Attorney, Agent, or Firm*—Jeffrey B. Huter

(57) ABSTRACT

Briefly, in accordance with one embodiment of the invention, a computing system includes an event programming interface and a management application. The management application is communicatively coupled to the event programming interface so that the management application may register an event that the event programming interface will notify the management application once that event has occurred. In one embodiment, the event programming interface may notify the management application of the occurrence of an event that is associated with a storage medium in a RAID process.

23 Claims, 3 Drawing Sheets

METHOD FOR COMMUNICATING OCCURRENCE OF EVENTS IN A STORAGE MEDIUM

BACKGROUND

A redundant array of inexpensive disks (RAID) process refers to a process by which a computing system may store data throughout a storage medium, such as an array of disk drives, so that at least portions of the data may be recovered should part of the storage medium fail. A processor in such a computing system may execute algorithms that determine the appropriate parity bit and location for the data to be stored. However, in large computing systems that frequently store data to disk drives, the burden on this processor to perform the RAID process may be significant. Because of this burden, the computing system may have reduced computing resources available for other tasks.

To reduce the burden on the processor, Intelligent Input/Output ($I_2O$) controllers have been developed. Simply stated, $I_2O$ processors off-load responsibility for storing data on the disk drives from the processor so that the processor is available to perform other functions. Examples of implementing the $I_2O$ functions are described in the Intelligent Input/Output Architecture Specification, revision 1.5, published March 1997 by the $I_2O$ Special interest Group.

Nonetheless, there is a continuing need for better ways to improve the interaction between applications running on the processor and the disk drives in a computing system that is implementing a RAID data storage process.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
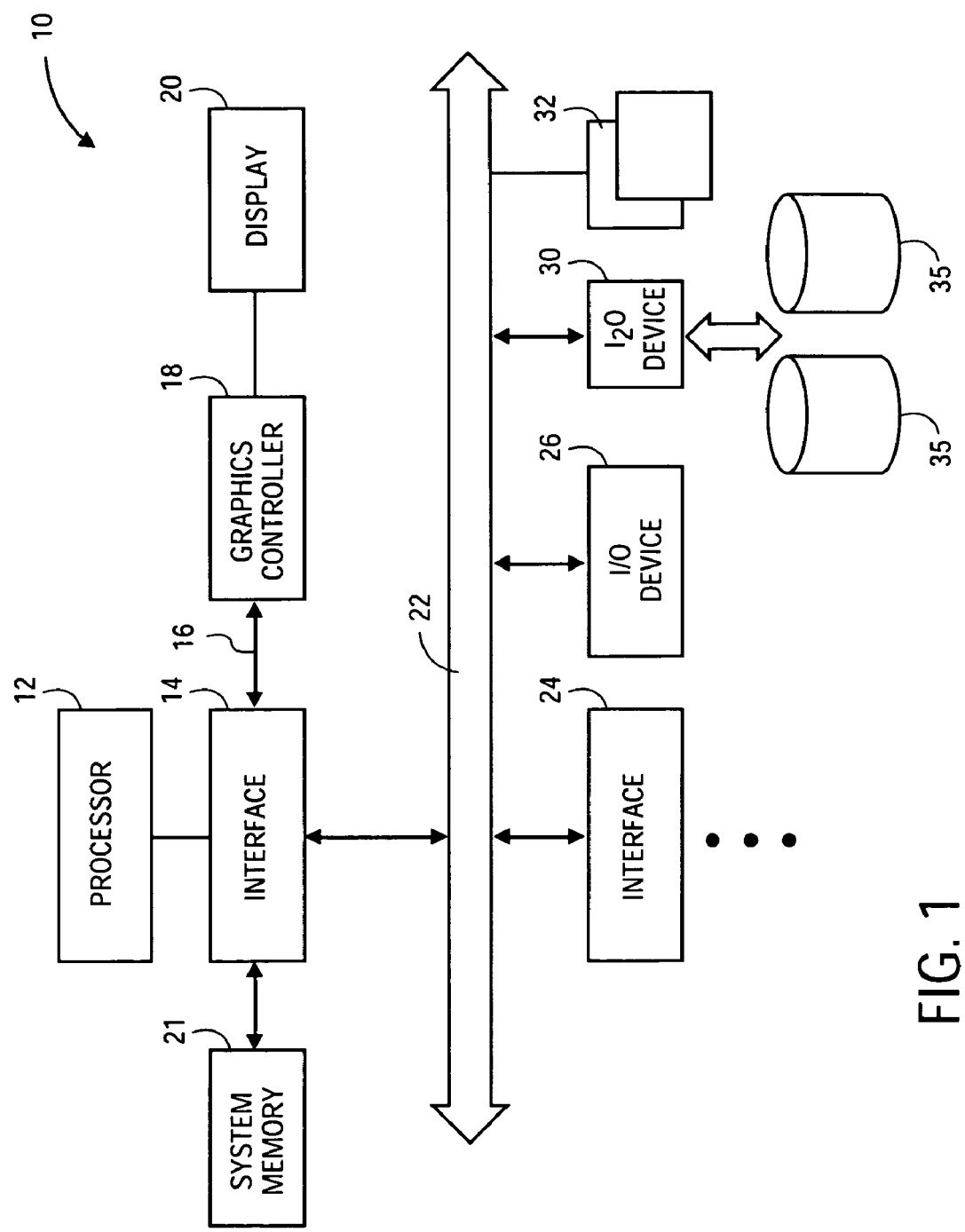
FIG. 1 is a block diagram representation of a computing system in accordance with an embodiment of the present invention.

Where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations are the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing" or "computing" or calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Referring to FIG. 1, a processor-based, computing system 10 may include a processor 12 coupled to an interface 14. Although the scope of the present invention is not limited so as to require interface 14, interface 14 may be a bridge or a part of a chipset, for example. Interface 14 may be coupled to a graphics controller 18, for example, by an accelerated graphics port (AGP) bus 16 (see Accelerated Graphics Port Interface Specification, Rev. 1.0, published on Jul. 31, 1996 by Intel Corporation, Santa Clara, Calif.). Controller 18 may control a display 20 to display information generated and processed by processor 12, for example. Interface 14 may also be coupled to a host system memory 21. Host system memory 21, for example a disk drive, cache memory, or static random access memory (SRAM), may be a machine-readable storage medium that may be used to provide the instructions executed by processor 12.

Interface 14 may also be coupled to a bus 22. Although the scope of the present invention is not limited in this respect, in one embodiment, bus 22 may comprise a Peripheral Component Interconnect (PCI) bus which is compliant with the PCI Local Bus Specification, Rev. 2.1, dated Jun. 1, 1995 and available from the PCI Special Interest Group, Portland, Oreg. 97214.

Bus 22 may also optionally be coupled to an interface 24, which may be part of a chipset or which may be implemented by a bridge, for example, although the scope of the present invention is not limited in this respect. Also coupled to bus 22, may be an input/output (I/O) device 26, which may be a host adapter in one embodiment of the invention. I/O device 26 may be, for example, a SCSI Fibre Channel (ANSI Standard X.3230-1994-Fibre Channel Physical and Signaling Standard (FC-PH), an Ethernet device, or a Next Generation I/O (NGIO) device.

Computing system 10 may also include an Intelligent Input/Output ($I_2O$) device 30, which in turn, may be coupled to one or more disk drives 35. Although not limited in scope in this respect, $I_2O$ device 30 may optionally include components such as non-volatile memory, an SCSI controller, and a processor such as the i960®Rx I/O processor available from Intel Corporation, Santa Clara, Calif. In the embodiment illustrated in FIG. 1, $I_2O$ device 30 is coupled to a storage medium, such as disk drive(s) 35, which represent any storage medium that may be used to implement a redundant array of inexpensive disks (RAID) data storage process. Although the scope of the present invention is not limited in this respect, in this embodiment $I_2O$ device 30 is intended to perform at least some of the instructions used to store and retrieve data in a RAID system so as to reduce the burden on processor 12 of system 10. Computing system 10 may also include other modules or components 32 as desired.

During the operation of system 10, situations may occur in either hardware or software that prompt system 10 to respond accordingly. These situations may occur either externally to computing system 10, such as in peripherals like storage mediums, or the situations may occur internally in the software operating within computing system 10. These situations are referred to as events. Although the scope of the present invention is not limited in this respect, examples of events that may occur in a computing system using a RAID process to store data include: notification that a disk drive has failed or is about to fail, a change in the spin rate or temperature of a disk drive, expiration of the predicted lifetime of a disk drive, array migrations, initialization of disk drives, redistribution of data after a drive failure, recovery of data from remaining disks upon failure of one or more disks, start or end of a disk format, an array expansion by adding more disks, or deletion or creation of a raid volume.

Again, the term "event" need not be limited to situations associated with a disk drive in a RAID system and the type of events to be reported are not meant to be limited to those described above. In alternative embodiments of the present invention, the occurrence of other types of "events" may be communicated such as ones associated with, for illustration only, peripheral communications, security, data processing, power management, etc.

Figure 2:
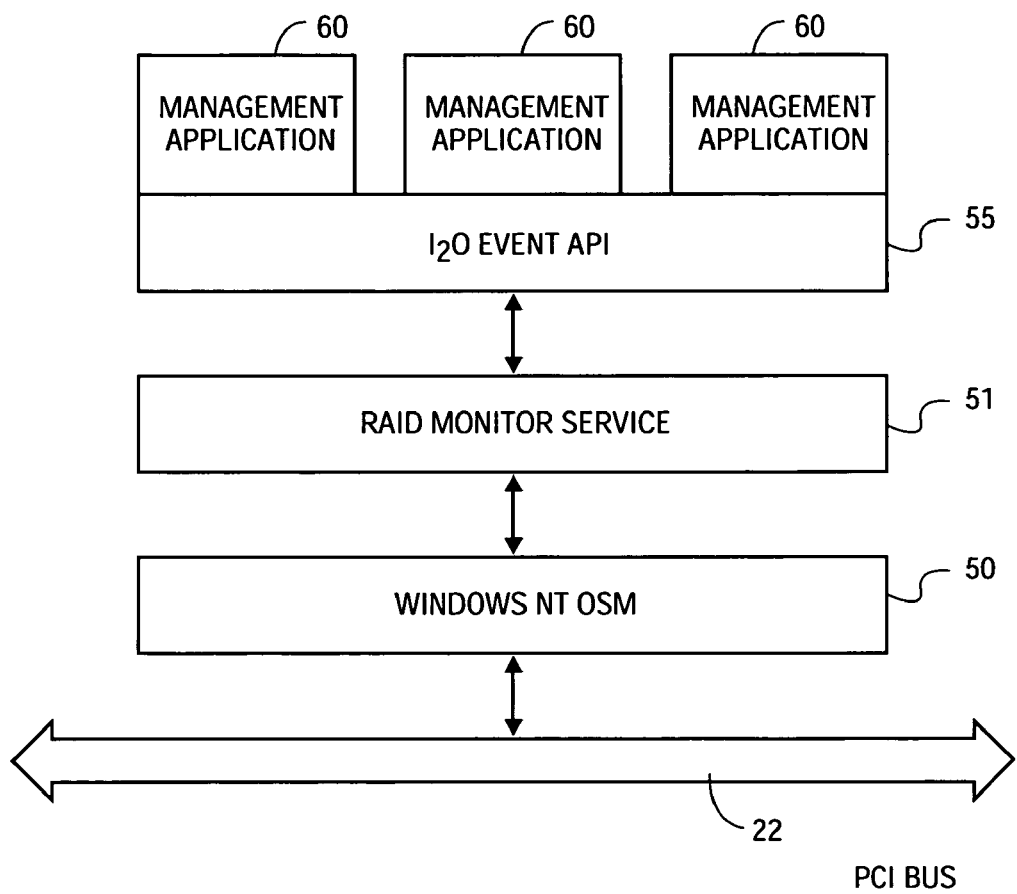
FIG. 2 is a block diagram representation of communicative coupling between in accordance with an embodiment of the present invention.

Referring now to FIG. 2, an embodiment that provides for communicating the occurrence of an event to other applications is provided. In the embodiment illustrated in FIG. 2, each of the various components is implemented as a software routine, program, or a dynamic linked library (DLL). However, it should be understood that in other embodiments of the present invention, various modules shown in FIG. 2 may be implemented as hardware, for example logic circuits, programmable logic arrays (PLA's), or the like. Furthermore, it should be understood that the scope of the present invention is not limited to computing systems that operate each and every module shown in FIG. 2. For example, alternative embodiments may not perform all of the modules shown, or some of the modules may be performed by other computing systems (not shown). Moreover, some of the functions shown in FIG. 2 may be combined into one computer program or separated into several independently running programs.

FIG. 2 is a block diagram representation of various modules that may be operating on processors within or external to computing system 10. The illustration is intended to demonstration how the various modules are communicatively coupled to each other in this particular embodiment while computing system 10 is in operation. The following embodiment is described as it may be implemented in a Windows NT® platform. Windows NT® is a registered trademark of Microsoft Corporation, Redmond, Wash. However, the present invention may also be implemented on other software platforms, such as Linux, UnixWare, or the like.

FIG. 2 includes a Windows NT® Operating System Services Module (OSM) 50, which may be used to manage the interaction between the operating system running on computing system 10 and external peripherals via bus 22. Operating above Windows NT® OSM 50 may be a RAID monitor service program 51 that coordinates the RAID process between a host processor (e.g., processor 12) and an $I_2O$ controller (e.g., $I_2O$ device 30). Among other things, RAID monitor service 51 may record, track, and report events that are detected by $I_2O$ controllers or other peripheral controllers.

Abstracted from, and residing above, RAID monitor service 51, is an event application programming interface (API) 55 which may be used to notify one or more desktop management applications 60 (hereinafter, management applications or applications) of the occurrence of an event(s). However, the scope of the present invention is not limited to this particular event API as alternative programming interfaces may also be used. Management application(s) 60 may be programs, routines, algorithms, DLL's, or the like that are being executed by the host processor. Examples of management applications include: Simple Network and Management Protocol Extension Agents (SNMP's), Desktop Management Interface Component Instrumentation (DMI's), RAID monitor applications, or like. However, it should be understood that the scope of the present invention is not restricted in this respect as the embodiments of the present invention may be used to communicate the occurrence of virtually any event to any application that requests such information.

Figure 3:
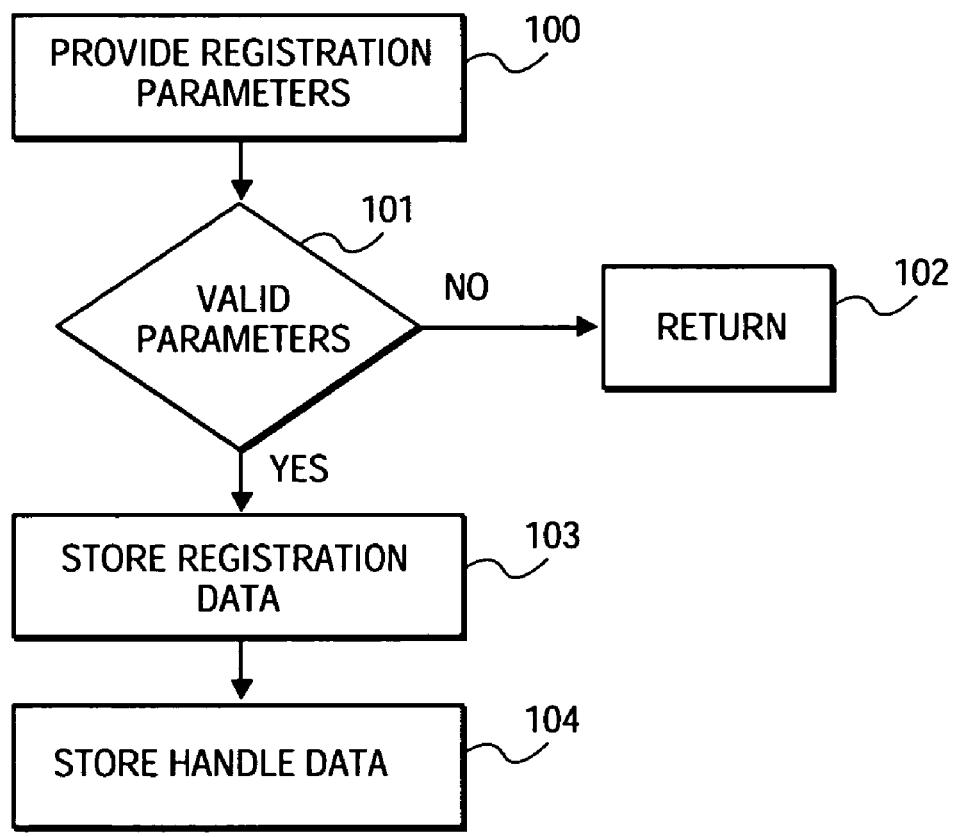
FIG. 3 is a flow chart illustrating the process by which an application may register itself with an event interface in accordance with an embodiment of the present invention.

Referring to FIG. 3, an embodiment of a process for registering a management application 60 with an event API 55 is now provided. At box 100, management application 60 provides event API 55 with registration parameters associated with an event. For example, management application 60 may provide information that identifies by name or numeric value the I/O processor, the storage medium, or the type of event that event API 55 is to notify management application 60 of. It should also be understood that the values or identification information provided may be optionally coded, if desired.

Management application 60 may also provide event API 55 with a callback function. The callback function may identify the response to be taken by either management application 60 or another program running on computer system 10. For example, the callback function may identify the routine or DLL to be executed once event API 55 notifies management application 60 of the occurrence of the event. Although the scope of the present invention is not limited in this respect, management application 60 may provide this information to event API 55 in the form of a data structure that includes fields associated with each piece of event information.

Upon receipt, event API 55 determines if the parameters are valid, box 101. If the registration request does not contain valid information, then event API 55 may return a NULL character, box 102, to indicate that registration has not occurred. If the request is valid, then event API 55 may allocate memory and store the data or the data structure associated with the event that event API 55 is to notify management application 60 of, box 103.

Once the data has been stored, event API 55 establishes a connection (e.g., an interprocess communication) with RAID monitor service 51 through a named pipe. Event API 55 may store the handle as part of the data associated with the event to be reported, box 104. As explained in more detail below, the handle data may later be used by management application 60 to unregister itself with event API 55.

Once registered, event API 55 monitors the events, including hardware events, that occur within computing system 10. This includes the events that are reported through Window NT® OSM 50 and RAID monitor service 51. During the operation of computing system 10, RAID monitor service 51 may constantly or periodically update event API 55 with events that have recently occurred. If an event occurs that is of the type previously registered, event API 55 may use the callback function information to notify management application 60 of the occurrence of the event. Event API 55 may also provide management application 60 with any data associated with the event or the context that was originally specified by management application 60 when it registered with event API 55.

If event API 55 has notified management application 60 of the occurrence of a particular event, or if management application 60 no longer desires to be notified of a particular event, management application 60 may unregister itself with event API 55. To do so, management application 60 may simply pass the handle associated with the registration of this particular event, see box 104 of FIG. 2, so that event API 55 will proceed as if that handle was invalid.

In the embodiments described above, management application 60 registered a single event with event API 55. However, it should be understood that the scope of the present invention is not limited in this respect as different management applications may register with the event API, each to be notified of the same event, or one management application may register several events that the event API is to notify that management application once those events occur.

One advantage of the embodiments of the present invention is that desktop management applications may now be notified of the occurrence of events without having to actively search for their occurrence. This improves the efficiency of the management applications as they no longer have to randomly or periodically poll the RAID monitor service to check if an event has occurred. This also improves the response time of the management application as the management application may be notified of the occurrence of an event as soon as the event API becomes of aware of it.

The present invention also provides the management application with information that was previously unavailable and not supported on Windows NT® platforms. Thus, the functionality and flexibility of the management applications may be improved. Furthermore, embodiments of the present invention also obviate the need to modify each management application should there be a change in the event information provided by a RAID system. For example, if the format for reporting events by the RAID process should change, only the event API may need be updated to reflect any changes. It is not necessary that each management application be modified since the event API abstracts the event reporting function. This improves the compatibility of the applications that may run within a computing system and provides for seamless transitions if the RAID process is modified.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. In a computing device having an operating system module to interface with a RAID device controller that comprises an I/O processor, a method of indicating occurrence of an event to a management application, comprising:
   registering the management application with an event application programming interface;
   detecting occurrence of an event of the I/O processor with a RAID monitor service operating above the operating system module that interfaces with the RAID device controller; and
   notifying the management application program of the event via the event application programming interface,
   wherein registering includes storing a hardware identification value that identifies a storage medium associated with the event, and identifying the type of event.

2. The method of claim 1, further comprising updating the event application programming interface with the RAID monitor service upon occurrence of the event.

3. The method of claim 1, wherein registering the management application includes providing the event application programming interface with a callback function.

4. The method of claim 3, wherein the event application programming interface uses the callback function to notify the management application of the occurrence of the event.

5. The method of claim 1, wherein registering the management application includes creating an interprocess communication between the RAID monitor service and the management application.

6. The method of claim 1, further comprising the step of unregistering the management application with the event application programming interface upon notification of the event.

7. The method of claim 1, wherein the event application programming interface returns a callback function upon notification of the event.

8. In a computing device having an operating system module to interface with a device, a method for notifying an application of the occurrence of a hardware event comprising:
   registering the application with a programming interface;

detecting occurrence of the hardware event with a monitor service that operates above the operating system module and that is separate from the programming interface; and upon detecting occurrence of the hardware event, notifying the application of the hardware event via the programming interface, wherein registering the application includes storing data identifying an input/output processor that monitors the device, identifying the type of event and wherein storing the data includes storing a hardware identification value that identifies a storage medium associated with the event.

9. The method of clam 8, wherein storing the data includes storing data identifying the hardware event that the programming interface notifies the application of once the hardware event has occurred.

10. The method of claim 8, further comprising notifying the programming interface of the occurrence of the hardware event with a RAID monitor service.

11. The method of claim 8, wherein notifying the application includes providing a callback function.

12. An article comprising:

a machine readable storage medium having stored thereon instructions capable of being executed by a data processing platform, said instructions being adapted to register a management application with a programming interface so that the programming interface is capable of notifying the management application of an event detected by a RAID monitor service that operates above an operating system module that interfaces with an I/O processor of a RAID device controller, wherein said instructions being adapted to register the management application are further adapted to store a hardware identification value that identifies a storage medium associated with the event, and identifying the type of event.

13. The machine readable storage medium of claim 12, wherein said instructions are further adapted to unregister the management application.

14. The machine readable storage medium of claim 12, wherein said instructions are further adapted to notify the management application of a hardware event.

15. The machine readable storage medium of claim 14, wherein the hardware event is selected from the group consisting of a disk drive failure, disk drive initialization, array migration, and data recovery.

16. The machine readable storage medium of claim 12, wherein said instructions are further adapted to register a processor identification value.

17. An article comprising:

a processor;

a medium for storing instructions;

a medium for storing data; and a module to interface with an I/O processor that monitors the medium for storing data;

wherein instructions on the medium for storing instructions define a monitor service adapted to cause the processor to detect via the module the occurrence of an event with the medium for storing data, to indicate the occurrence of the event to a management application and wherein instructions on the medium for storing instructions are adapted to register the management application including storing a hardware identification value that identifies a storage medium associated with the event, and identifying the type of event.

18. The article of claim 17, wherein the management application is selected from the group consisting of a desktop management program, a RAID system management application, and a RAID monitor application.

19. The article of claim 17, wherein the device medium for storing data comprises a RAID device and the monitor service comprises a RAID monitor service.

20. The article of claim 19, further comprising an intelligent input/output controller to interface with the RAID device, wherein the intelligent input/output controller comprises the I/O processor.

21. An apparatus comprising:

a processor;

a RAID controller comprising an I/O processor;

an operating system module to interface with a RAID device via the I/O processor of the RAID controller;

a RAID monitor service to detect events of the RAID device via the operating system module;

an event programming interface; and a management application to register an event with the event programming interface and to provide the event programming interface with a hardware identification value that identifies a storage medium associated with the event, and identifying the type of event, wherein the event programming interface is adapted to notify the management application of the event detected by the RAID monitor service.

22. The apparatus of claim 21, further comprising a storage medium, wherein the storage medium comprises instructions that cause the processor to register the management application with the event programming interface.

23. The apparatus of claim 22, wherein the storage medium further comprises instructions that cause the processor to provide the function of the event programming interface.

* * * * *